United States Patent [19]
Daniel

[11] 3,787,080
[45] Jan. 22, 1974

[54] PIPE COUPLINGS

[76] Inventor: Brian Percy Daniel, 5, The Pagoda, Maidenhead; Berkshire, England

[22] Filed: Jan. 25, 1972

[21] Appl. No.: 220,634

[30] Foreign Application Priority Data
May 20, 1971 Great Britain............... 16120/71
Jan. 26, 1971 Great Britain............... 3178/71

[52] U.S. Cl............................. 285/341, 285/382.7
[51] Int. Cl............................................. F16l 17/00
[58] Field of Search...................... 285/341, 382.7

[56] References Cited
UNITED STATES PATENTS
2,536,745  1/1951  Herold.................... 285/382.7 X
FOREIGN PATENTS OR APPLICATIONS
6,505,123  1/1966  Netherlands................ 285/341

Primary Examiner—Dave W. Arola
Attorney, Agent, or Firm—Emory L. Groff et al.

[57] ABSTRACT

A compression type pipe coupling in which the ring is formed with a front annular cutting tooth which cuts into the pipe surface on initial tightening of the nut, and is then stopped against further forward movement, further nut tightening resulting in the ring bowing to cause a rear annular cutting to enter the pipe surface, the ring also having an annular cavity between said teeth.

2 Claims, 8 Drawing Figures

PIPE COUPLINGS

BACKGROUND OF THE INVENTION

This invention concerns pipe couplings of the type incorporating a union body or socket member having a bore to receive and locate a pipe end to be coupled, the bore having a flared mouth, a nut or like member being provided to engage the socket member by screw threads, there also being provided a ring to embrace a pipe end to be coupled and which ring has a cutting tooth at its front end and is positioned in the coupling with its front end in the flared mouth, the nut having an inturned flange with a camming area, the action of tightening the nut forcing the ring forwardly so that it is deformed and its front end constricted on to the pipe. The rear end of the ring has a surface co-operating with the camming area and the front end of the ring is formed so that on deformation, the tooth cuts into the pipe. Rings as above also may have a cutting tooth at the rear end.

The invention concerns in particular an improved form of ring or thimble and it has for an object to provide a ring which ensures the effective sealing, and which minimises the risk of fracture of or damage to a coupled tube or pipe which could be caused e.g. by the overtightening or vibration in use. Another object is to provide a ring or thimble by which a positive indication is given as the nut is tightened by an increase in torque at the point where the nut has been tightened sufficiently for a good coupling. A further object is to provide a ring or thimble which can be used for the coupling of pipes or tubes of different materials e.g. of metal such as steel or softer material such as rubber or synthetic plastics.

SUMMARY OF THE INVENTION

According to the invention the pipe coupling comprises a union body socket, pipe end locating means therein, leading to a flared socket mouth, a union nut engaging said body socket by screw threads, an inturned rear flange with a forwardly facing camming area thereon, a sealing ring to embrace said pipe end, a front annular bead around said ring to engage in said flared mouth, an undercut from the front ring end forming an internal circumferential pipe cutting tooth, an internal circumferential cutting at the rear end of said ring, an outer tapering rear surface on said ring for engagement by the camming area, an annular cavity in from said ring bore between said teeth, and stop means between said ring and mouth to define inward movement thereof after initial tightening of the nut with the front tooth cutting into the pipe, subsequent tightening bowing the ring bridge wise between said teeth.

Thus, after the front tooth has cut into the pipe, the ring is held against further movement and continued tightening causes the ring to bow and the rear end to constrict on to the pipe due to a specific weakened circumferential area of the ring. As the rear end meets the pipe surface an increase in torque against tightening is produced and this can be further increased by providing an annular ring surface rearwardly of said rear tooth.

BRIEF DESCRIPTION OF THE DRAWINGS

Preferred embodiments according to the invention will now be described by way of example with reference to the accompanying drawings, in which.

DESCRIPTION OF PREFERRED EMBODIMENTS

Figure 1:
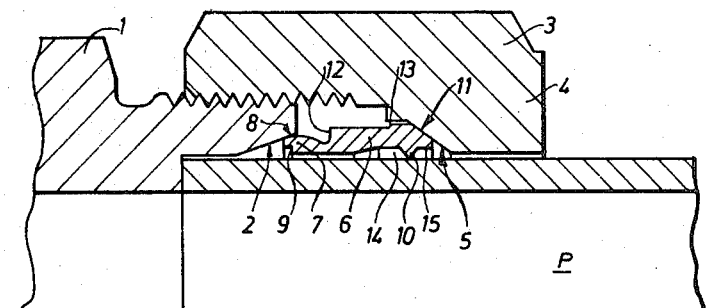
FIG. 1 is a sectional view of one embodiment before the nut is tightened.
Figure 2:
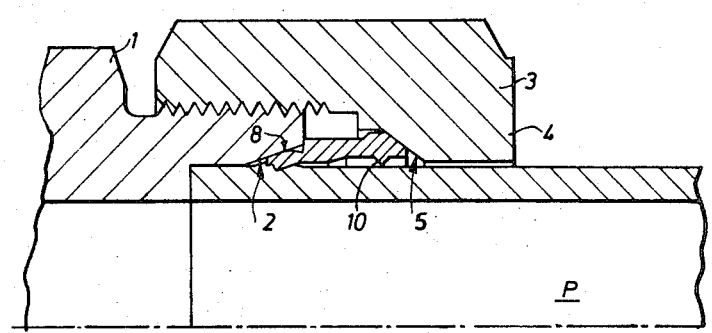
FIG. 2 is a similar view with the nut partly tightened.
Figure 3:
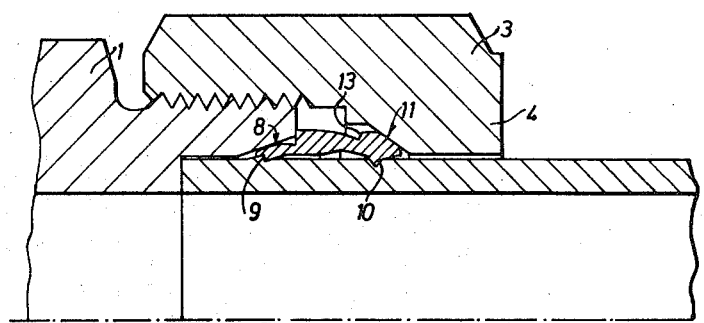
FIG. 3 is a similar view with the nut fully tightened.

Referring first to FIG. 1 – 3, the coupling is of known form consisting of a coupling body 1 the bore of which is stepped to locate the end of a pipe P; this bore having an outwardly tapered or flared mouth 2, and being externally screw threaded for engagement thereon of a coupling nut 3, which nut has an inturned flange 4, with a tapered camming area 5, so that when the nut is tightened, a sealing ring around the pipe is deformed to provide a fluid-tight seal.

Figure 5:
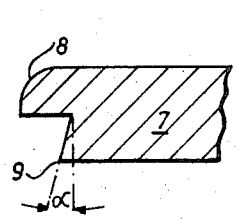
FIGS. 4 and 5 are enlarged views of modified forms of the front end of the ring.
Figure 4:
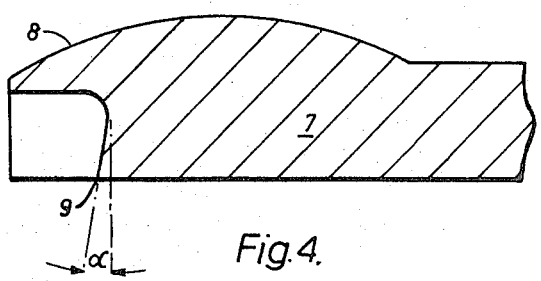

The invention concerns essentially the ring and in the embodiment illustrated in FIGS. 1 – 3, the ring 6 has a front end 7 which is adapted to abut the outwardly tapered or flared mouth 2 of the socket or coupling member 1. The front end and upper surface is formed with a bead like upstanding curved part 8 and the inner surface is undercut so that a circumferential cutting tooth 9 is formed. The bead like part may be of a shallow arcuately curved form as shown in FIG. 4 or abruptly curved forwardly of the tooth 9 as shown in FIG. 5. The inner surface could be formed with more than one cutting tooth.

The inner surface of the ring 6 is also formed with a circumferential cutting tooth 10 near its rear end, and the upper surface at this end is formed with an inclined camming surface 11 to be engaged in the usual way by the taper camming area 5 on the forward face of the flange 4. The outer surface of the ring is formed with steps 12, 13, and a recess 14 is formed in the bore. The ring also has an internal circumferential surface part 15 to the rear of the tooth 10.

In use, as the nut is tightened from the position of FIG. 1, with its taper surface contacting the surface 11 and the front end 7 bearing on the socket flare, the front portion of the ring 6 is first constricted on to the pipe the ring deforming near the shoulder 12, which provides a first weakened area, the shoulder also abutting the end of the union or socket mouth with the cutting edge 9 biting into the pipe surface to raise in front a sealing rim (FIG. 2). When the tooth has penetrated sufficiently, resistance to further deformation builds up as the shoulder 12 is firm against the socket mouth, and the ring deforms in the locality of the shoulder 13, which provides another weakened area so that the tooth 10 now bites into the pipe until the inner surface part 15 to the rear of the tooth bears on to the pipe surface, the ring being constrained against forward movement by the engagement of the shoulder 12 and mouth. The part 15 has an area large enough to bear on the pipe to produce a large increase in the nut-turning torque to give an indication of when the nut is sufficiently tightened. The final fully tightened position is shown in FIG. 3.

Referring now to FIGS. 4 and 5, the arc of curvature of the bead can vary according to the type of coupling and its purpose. If the ring front is as shown in FIG. 5, then preferably, the angle of the flare 2 will be more acute than with the ring with the front end shown in FIG. 4. In these constructions also the tooth 9 has a forward rake angle, so that on deformation the tooth attacks the pipe at the correct angle. The rake angle can be between 1° and 5°, preferably 2°, being shown exaggerated in the drawings.

Figure 6:
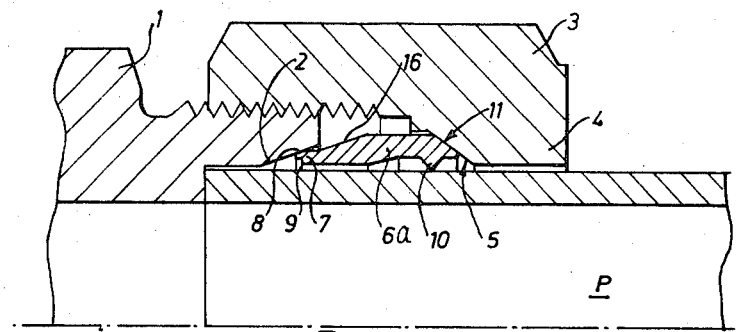
FIGS. 6 – 8 are views similar to FIGS. 1 – 3 respectively of another form of ring according to the invention.
Figure 7:
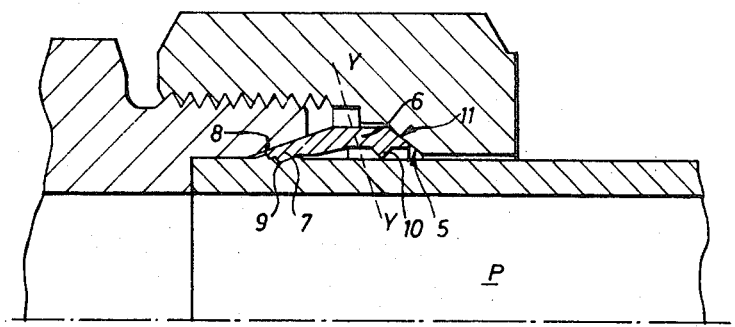
Figure 8:
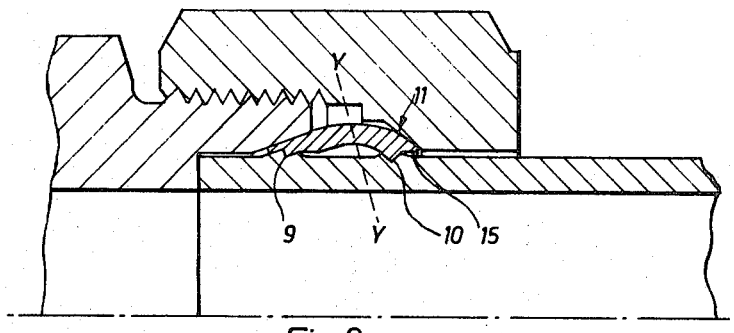

Referring now to the embodiment illustrated in FIGS. 6 - 8 the coupling is generally as shown in FIGS. 1 - 3. The ring 6a has a median tapering outer surface part 16. The front end 7 of the ring has a step or undercut to form the cutting edge 9, slightly back from this end. The outer surface at this end also has the bead or arcuate curved part 8 which can be as shown in either FIGS. 4 OR 5, preferably the former. A rear camming surface 11 is also provided for engagement by the tapered camming area 5 of the nut flange. The ring also has a circumferential tooth 10 slightly forwardly of its rear end to leave a cylindrical surface part 15 between this tooth and the rear end.

When the nut is tightened, the tapered flange nut surface 5 bears on the surface 11 first to drive, the ring inwardly, until the surface 8 meets the surface 2 and the front end of the ring is constricted on to the surface of the pipe P, until the surfaces 2 and 16 contact. When these surfaces contact completely, there is no further constriction of the front end and the ring cannot move further forwardly and the increased resistance by such contact causes the ring to bend approximately on the line Y—Y, until the tooth 10 penetrates into the surface of the pipe P, and the surface part 15 finally seals on the pipe so as to restrain forward movement of the nut.

In all of the embodiments the tooth 9 preferably has a forward rake angle as shown in FIGS. 4 and 5. It will be noted that a distinct cavity 14 is formed between the pipe surface and ring bore between the teeth 9, 10 so that when used with flexible pipes, the pipe end part in the cavity can swell thereinto thus increasing the sealing effect and also holds the pipe and mimimises the risk of the pipe being forced out of the coupling. The cavity results in the bowing of the ring.

I claim:

1. A coupling for connecting pipe ends comprising a union body socket including an externally threaded end portion, pipe end locating means therein leading to a flared socket mouth, a union nut engaging said body socket end portion by screw threads and including an inturned rear flange with a forwardly facing camming area thereon, a sealing ring between said socket mouth and said camming area to embrace said pipe end, a front annular bead around said ring engaging said flared mouth, an undercut from the front ring end forming an internal circumferential pipe cutting tooth having a forward rake angle, an internal circumferential cutting tooth at the rear end of said ring, an outer tapering rear surface on said ring for engagement by the camming area, an annular cavity in the inner surface of said ring between said teeth, a first step on the outer surface of said ring providing forwardly facing stop means on said ring between said annular bead and cavity to limit inward movement of said ring after initial tightening of the nut as the front tooth cuts into the pipe, an annular groove in the outer surface of said ring at the junction of said step with said annular bead to provide a first weakened area, a second step on the outer surface of said ring above said annular cavity and forwardly of said tooth at the rear end of said ring, said second step spaced rearwardly from said first step and providing a second weakened area, whereby subsequent tightening of the nut causes bowing of the ring bridge-wise at the weakened areas between said teeth.

2. A pipe coupling according to claim 1 including a flat annular surface on said ring rearwardly of said rear tooth and beneath said outer tapering rear surface, said annular surface bearing on the surface of said pipe ends when said nut is tightened to produce an increase in the nut-turning torque to indicate when the nut is sufficiently tightened.

* * * * *